(12) United States Patent
Dumler et al.

(10) Patent No.: US 12,394,217 B2
(45) Date of Patent: *Aug. 19, 2025

(54) APPARATUS AND METHOD FOR DETECTING A STATE OF A ROAD SURFACE

(71) Applicant: Fraunhofer-Gesellschaft zur Foerderung der angewandten Forschung e.V., Munich (DE)

(72) Inventors: Dietrich Dumler, Munich (DE); Franz Wenninger, Munich (DE); Wolfgang Gerner, Neubiberg (DE); Harald Gossner, Neubiberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 16 days.

This patent is subject to a terminal disclaimer.

(21) Appl. No.: 17/930,651

(22) Filed: Sep. 8, 2022

(65) Prior Publication Data

US 2023/0079037 A1 Mar. 16, 2023

(30) Foreign Application Priority Data

Sep. 10, 2021 (DE) .......................... 102021210047.3
Feb. 14, 2022 (DE) .......................... 102022201522.3

(51) Int. Cl.
*G06V 20/58* (2022.01)
*G06T 7/11* (2017.01)
(Continued)

(52) U.S. Cl.
CPC .............. *G06V 20/588* (2022.01); *G06T 7/11* (2017.01); *G06T 2207/20021* (2013.01); *G06T 2207/30256* (2013.01); *G06V 10/764* (2022.01)

(58) Field of Classification Search
CPC ................................ G06V 20/588; G06T 7/11
See application file for complete search history.

(56) References Cited

U.S. PATENT DOCUMENTS

| | | |
|---|---|---|
| 5,218,206 A | 6/1993 | Schmitt et al. |
| 5,557,261 A | 9/1996 | Barbour |

(Continued)

FOREIGN PATENT DOCUMENTS

| | | |
|---|---|---|
| CN | 103703769 A | 4/2014 |
| CN | 207165573 U | 3/2018 |

(Continued)

OTHER PUBLICATIONS

Jonsson, Patrik, et al., [Uploaded in 3 parts] "Road Surface Status Classification Using Spectral Analysis of NIR Camera Images (1 of 3)", In: IEEE Sensors Journal, vol. 15, No. 3, 2015, S. 1641-1656.

(Continued)

*Primary Examiner* — Frank Johnson
(74) *Attorney, Agent, or Firm* — Perkins Coie LLP; Michael A. Glenn (57) ABSTRACT

Embodiments of the invention provide an apparatus for detecting a state of a road surface. The apparatus includes an input interface, an image divider, a parameter calculator, and a classifier. The input interface is configured to obtain recording information of the road surface, such as a camera recording. The image divider is configured to divide the recording information into a plurality of windows, wherein each window includes a plurality of image elements, and wherein each image element includes at least two different pieces of information, such as a spectral absorption of the road surface and/or a polarization of the reflected light. The parameter calculator is configured to calculate at least two parameters per window by using the at least two different pieces of information of each image element in the window. The classifier is configured to classify the window on the basis of a tuple of the at least two parameters of the window, and to detect, on the basis of the tuple of the at least two parameters of the window, as input values a state of the (Continued)

window and to output the state of the window as an output value.

19 Claims, 3 Drawing Sheets

(51) Int. Cl.
*G06V 20/56* (2022.01)
*G06V 10/764* (2022.01)

(56) References Cited

U.S. PATENT DOCUMENTS

| | | | |
|---|---|---|---|
| 5,962,853 | A | 10/1999 | Huth-Fehre et al. |
| 8,411,146 | B2 | 4/2013 | Twede |
| 10,823,562 | B1 | 11/2020 | Carnahan et al. |
| 11,520,018 | B2* | 12/2022 | Baumgartner ........ G01S 17/931 |
| 2008/0129541 | A1* | 6/2008 | Lu ..................... G06V 20/56 |
| | | | 340/905 |
| 2010/0295947 | A1 | 11/2010 | Boulanger |
| 2011/0149076 | A1* | 6/2011 | Capello ............... G01N 21/359 |
| | | | 348/148 |
| 2011/0267483 | A1 | 11/2011 | Kanamori |
| 2013/0144490 | A1 | 6/2013 | Lord et al. |
| 2014/0049405 | A1 | 2/2014 | Breuer et al. |
| 2014/0050355 | A1 | 2/2014 | Cobb |
| 2014/0184800 | A1 | 7/2014 | Hirai et al. |
| 2015/0221691 | A1 | 8/2015 | Watanabe |
| 2015/0339919 | A1 | 11/2015 | Barnett et al. |
| 2015/0371095 | A1* | 12/2015 | Hartmann ............. G06T 7/11 |
| | | | 348/148 |
| 2016/0069743 | A1 | 3/2016 | Mcquilkin et al. |
| 2016/0200161 | A1* | 7/2016 | Van Den Bossche . G01B 11/24 |
| | | | 250/206 |
| 2017/0124402 | A1 | 5/2017 | Tanaka et al. |
| 2017/0293812 | A1 | 10/2017 | Itoh et al. |
| 2018/0027191 | A2 | 1/2018 | Grauer |
| 2018/0302564 | A1* | 10/2018 | Liu ..................... G06T 7/33 |
| 2019/0188495 | A1 | 6/2019 | Zhao et al. |
| 2019/0188827 | A1 | 6/2019 | Mitani et al. |
| 2019/0260974 | A1 | 8/2019 | Kaizu et al. |
| 2019/0306471 | A1 | 10/2019 | Otsuki |
| 2019/0378257 | A1 | 12/2019 | Fan et al. |
| 2020/0023995 | A1 | 1/2020 | Song et al. |
| 2020/0260055 | A1 | 8/2020 | Choi |
| 2020/0280707 | A1 | 9/2020 | Briggs et al. |
| 2020/0286371 | A1 | 9/2020 | Yuasa |
| 2020/0317202 | A1* | 10/2020 | Staudacher ........... B60W 40/06 |
| 2020/0350353 | A1 | 11/2020 | Kurita et al. |
| 2021/0065565 | A1 | 3/2021 | Dow et al. |
| 2021/0118931 | A1 | 4/2021 | Matsunuma et al. |
| 2021/0241224 | A1 | 8/2021 | Taniguchi |
| 2021/0297638 | A1 | 9/2021 | Sugiyama |
| 2022/0107266 | A1 | 4/2022 | Baumgartner et al. |
| 2022/0180643 | A1 | 6/2022 | Retterath |
| 2022/0185313 | A1* | 6/2022 | Wang ................... G06V 20/588 |
| 2022/0196545 | A1* | 6/2022 | Imawaka .............. G01N 21/31 |

FOREIGN PATENT DOCUMENTS

| | | |
|---|---|---|
| CN | 110546950 A | 12/2019 |
| CN | 113257000 A | 8/2021 |
| DE | 102009036595 A1 | 2/2011 |
| DE | 102012110092 A1 | 4/2014 |
| DE | 102012110094 A1 | 4/2014 |
| DE | 102014224857 A1 | 6/2016 |
| DE | 102013201741 A1 | 8/2018 |
| DE | 102018132525 A1 | 6/2019 |
| DE | 112017005244 T5 | 7/2019 |
| DE | 102019205903 A1 | 10/2020 |
| DE | 112019003967 T5 | 4/2021 |
| EP | 2336749 A1 | 6/2011 |
| EP | 2375755 B1 | 8/2013 |
| EP | 3133646 A2 | 2/2017 |
| JP | S59188545 A | 10/1984 |
| JP | 2007232652 A | 9/2007 |
| JP | 2009257919 A | 11/2009 |
| JP | 2013148505 A | 8/2013 |
| JP | 2017083352 A | 5/2017 |
| JP | 6161007 B2 | 7/2017 |
| JP | 2018025528 A | 2/2018 |
| JP | 2018036314 A | 3/2018 |
| JP | 2018098641 A | 6/2018 |
| JP | 2018128265 A | 8/2018 |
| JP | 2020180924 A | 11/2020 |
| WO | 2010052593 A1 | 5/2010 |
| WO | 2011015196 A1 | 2/2011 |
| WO | 2013018743 A1 | 2/2013 |
| WO | 2013173911 A1 | 11/2013 |
| WO | 2014063701 A1 | 5/2014 |
| WO | 2014118337 A1 | 8/2014 |
| WO | 2020198134 A1 | 10/2020 |

OTHER PUBLICATIONS

Huber, Daniel F, et al., "A Spectro-polarimetric Imager for Intelligent Transportation Systems", Intelligent Transportation Systems, Oct. 17, 1997 pp. 94-102, XP055101934, Oct. 17, 1997, pp. 94-102.
Jonsson, Patrik , et al., "[Part 1 of 2] Road Surface Status Classification Using Spectral Analysis of NIR Camera Images", IEEE Sensors Journal, vol. 15, No. 3, pp. 1641-1656, pp. 1641-1648.
Jonsson, Patrik , et al., "[Part 2 of 2] Road Surface Status Classification Using Spectral Analysis of NIR Camera Images", IEEE Sensors Journal, vol. 15, No. 3, pp. 1641-1656, pp. 1649-1656.
Misener, James A, "UC Berkeley Working Papers Title Investigation Of An Optical Method To Determine The Presence Of Ice On Road Surfaces", California Path Program, Jan. 1, 1998 pp. 1-20, XP093017038, Jan. 1, 1998, pp. 1-20.
Google machine translation of the non-patent literature www.pubtpress.com, S. Meiti et al., Dec. 31, 2008, pp. 174-175, titled: "Fundamentals of digital media technology",, Planning Textbooks for Digital Media Specialty in Colleges and Universities in the 21st Century, Editor: Li Xueming, Beijing University of Posts and Telecommunications Press, 2008. (9 pages).
Abdel-Moati, et al., "Near field ice detection using infrared based optical imaging technology", Optics and Laser Technology 99 (2018): 402-410., 2018, pp. 402-410.
Achar, et al., "Self-supervised segmentation of river scenes", IEEE International Conference on Robotics and Automation • May 2011, 6227-6232, 05/2011, pp. 6227-6232.
Casselgren, et al., "Road condition analysis using NIR illumination and compensating for surrounding light", Optics and Lasers in Engineering 77(2016) pp. 175-182, 2016, pp. 175-182.
Colace, et al., "A near-infrared optoelectronic approach to detection of road conditions", Optics and Lasers in Engineering 51 (2013) 633-636, 2013, pp. 633-636.
Gailius, et al., "Ice detection on a road by analyzing tire to road friction ultrasonic noise", ISSN 1392-2114 ULTRAGARSAS (ULTRASOUND), vol. 62, No. 2, 2007., May 31, 2007, pp. 17-20.
Gregoris, et al., "Multispectral imaging of ice", 4. 2051-2056 vol. 4, 2004, pp. 2051-2056.
Kim, et al., "Wet area and puddle detection for Advanced Driver Assistance Systems (ADAS) using a stereo camera", International Journal of Control, Automation and Systems. 14. 263-271, 2016, pp. 263-271.
Maček, et al., "A Lane Detection Vision Module for Driver Assistance", Jan. 24, 2014, 7 pp.
Matthies, et al., "Detecting water hazards for autonomous off-road navigation", 2003, pp. 231-242.
Meiti, et al., www.pubtpress.com, S. Meiti et al., Dec. 31, 2008, pp. 174-175. English summary to follow when available.
Nakauch, et al., "Selection of optimal combinations of band-pass filters for ice detection by hyperspectral imaging", Optics Express, vol. 20, No. 2 Jan. 16, 2012, 986-1000, Jan. 16, 2012, pp. 986-1000.
Nakayama, Yasunori, 2. 1 Space Filtering (vol. 1, Chapter 4) in "Application and Analysis Technology of Remote Sensing", First edition, First printing, Aug. 8, 2019, pp. 31-32, ISBN: 978-4-86043-

(56) References Cited

OTHER PUBLICATIONS 612-4 (Publication showing well-known technology; Newly cited publication) [No English version available.], [No English version available.], Aug. 8, 2019, 31-32.

Nguyen, et al., "3D tracking of water hazards with polarized stereo cameras", 2017 IEEE International Conference on Robotics and Automation (ICRA) Singapore, May 29-Jun. 3, 2017, May 29, 2017, 8 pp.

Piccardi, et al., "Optical Detection of Dangerous Road Condition", Sensors 2019, 19, 1360; doi:10.3390/s19061360, 2019, pp. 283-288.

Rankin, et al., "Daytime water detection based on color variation", 2010 IEEE/RSJ International Conference on Intelligent Robots and Systems, 2010, pp. 215-221, 2010, pp. 215-221.

Rankin, et al., "Daytime water detection based on sky reflections", Robotics and Automation (ICRA) 2011 IEEE International Conference on. IEEE, 2011, pp. 5329-5336, Jun. 2011, pp. 5329-5336.

Riehm, et al., "Ice formation detection on road surfaces using infrared thermometry", Cold Regions Science and Technology. s 83-84. 71-76, 2012, pp. 71-76.

Troiano, et al., "New System for Detecting Road Ice Formation. Instrumentation and Measurement", IEEE Transactions on Instrumentation And Measurement, vol. 60 No. 3, pp. 1091-1101.-ISSN 0018-9456, Apr. 2011, pp. 1091-1101.

Viikari, et al., "Road-condition recognition using 24-GHz automotive radar", IEEE Transactions on Intelligent Transportation Systems, vol. 10, No. 4, pp. 639-648, 2009, Dec. 2009, pp. 639-648.

Xie, et al., "Polarization-Based Water Hazards Detection for Autonomous Off-road Navigation", Proceedings of the 2007 IEEE International Conference on Mechatronics and Automation, ICMA 2007. 3186-3190., Oct. 29, 2007, pp. 3186-3190.

Wu, et al., "A Survey of Vision-Based Road Parameter Estimating Methods", Oct. 5, 2020 (Oct. 5, 2020), Oct. 5, 2020, pp. 314-325, XP047567286.

* cited by examiner

APPARATUS AND METHOD FOR DETECTING A STATE OF A ROAD SURFACE

CROSS-REFERENCE TO RELATED APPLICATION

This application claims priority from German Patent Application No. 10 2022 201 522.3, which was filed on Feb. 14, 2022, and from German Patent Application No. DE 10 2021 210 047.3, which was filed on Sep. 10, 2021, which are both incorporated herein in their entirety by reference.

BACKGROUND OF THE INVENTION

The present application concerns an apparatus and a method for detecting a state of a road surface.

Detecting road conditions is essential for safe driving. Modern vehicles estimate general risks of road conditions with the help of sensors, such as optical sensors For example, the situation in front of a vehicle is recorded with a camera. On a red-green-blue (RGB) image, for example, it is difficult to differentiate a wet spot from a dirty spot on a road surface since both are just dark. Even though water is transparent, water is easily visible in RGB images due to different effects changing the path of a light beam. Current object detection methods use RGB data to detect objects, such as pedestrians. However, objects, such as puddles, with simple shapes and complex optical behavior, such as reflection or transparency, are hard to detect. Environmental variables, such as daylight, background, and underground, change the appearance of weather-caused accumulations, or depositions, significantly, which further complicates the detection.

RGB cameras or RGB image sensors cannot determine the different effects, such as absorption and/or polarization. Thus, the results of the localization and classification methods strongly depend on each case and are unreliable.

SUMMARY

According to an embodiment, an apparatus for detecting a state of a road surface may have: an input interface for acquiring recording information of a road surface; an image divider for dividing the recording information into a plurality of windows, wherein each window comprises a plurality of image elements, wherein each image element comprises at least two different pieces of information; a parameter calculator for calculating at least two parameters per window by using the at least two different pieces of information of each image element in the window; and a classifier for classifying the window on the basis of a tuple of the at least two parameters of the window, wherein the classifier is configured to detect, on the basis of the tuple of the at least two parameters of the window, as input values a state of the window and to output the state of the window as an output value.

Another embodiment may have a transportation device having the inventive apparatus and an interface, wherein the interface is configured to notify a driver of the transportation device and/or to influence a control of the transportation device, if the apparatus detects a solid state of water.

Another embodiment may have a method for detecting a state of a road surface having the steps of: acquiring recording information of the road surface; dividing the recording information into a plurality of windows, wherein each window comprises a plurality of image elements, wherein each element comprises at least two different pieces of information; calculating at least two parameters per window by using the at least two different pieces of information of each image element in the window; and classifying the window on the basis of a tuple of the at least two parameters of the window so as to acquire, on the basis of the tuple of the at least two parameters of the window, a state of the window.

Another embodiment may have a non-transitory digital storage medium having a computer program stored thereon to perform the method for detecting a state of a road surface, the method having the steps of: acquiring recording information of the road surface; dividing the recording information into a plurality of windows, wherein each window comprises a plurality of image elements, wherein each element comprises at least two different pieces of information; calculating at least two parameters per window by using the at least two different pieces of information of each image element in the window; and classifying the window on the basis of a tuple of the at least two parameters of the window so as to acquire, on the basis of the tuple of the at least two parameters of the window, a state of the window, when said computer program is run by a computer.

Embodiments of the invention provide an apparatus for detecting a state of a road surface. The apparatus comprises an input interface, an image divider, a parameter calculator, and a classifier.

The input interface is configured to obtain recording information of the road surface, such as a camera recording.

The parameter calculator is configured to calculate at least two parameters per window by using the at least two different pieces of information of each image element in the window.

The classifier is configured to classify the window on the basis of a tuple of the at least two parameters of the window. The classifier is configured, on the basis of the tuple of the at least two parameters of the window, to detect as input values a state of the window, and to output the state of the window as an output value.

In other words, the inventive apparatus uses a window-by-window, or elementary, classification. This elementary classification is based on an extraction of the optical characteristics of road surfaces from the sensor recording, in particular by evaluation of the spectral absorption of the road surface and/or the polarization of the reflected light.

An elementary, or window-by-window, classification increases the resilience of the apparatus against image element errors, since an image element error has only local effects in the case of a window-by-window classification.

The window-by-window classification enables a window-by-window evaluation. The quality of the classification may be determined through a comparison of the window with the result of the classification.

In addition, compared to a current image detection for detecting a state of a road surface, the inventive image sensor uses a decreased computational effort.

Thus, the image sensor provides a reliable and robust detection of a state of a road surface and at the same time a simple window-by-window evaluation.

In embodiments, the input interface is configured to either obtain the output information from a sensor, or to obtain several sensor recordings and to assemble the recording information from the obtained sensor recordings. The recording information of the road surface comprises per image element at least two sensor recordings from a group of at least four sensor recordings.

The group of sensor recordings comprises a first sensor recording of the road surface with a first optical bandwidth in which water has a first absorption rate.

The group of sensor recordings comprises a second sensor recording of the road surface with a second optical bandwidth in which water has a second absorption rate that is higher than the first absorption rate.

The group of sensor recordings comprises a third sensor recording with a first polarization filter having a first polarization angle.

The group of sensor recordings further comprises a fourth sensor recording with a second polarization filter having a second polarization angle different from the first polarization angle.

The recording information of the road surface comprises at least two sensor recordings per image element.

Absorption information make it possible to more easily find specific materials with certain absorption properties in the recording.

For example, the use of a first and a second sensor recording with different optical bandwidths in which water has different absorption rates enables a detection of water on a road surface.

Sensor recordings with polarization filters make it possible to analyze the light beams reflected on the surface. For example, the reflection of liquid water exhibits a high polarization ratio of the light with predominately horizontal orientation, whereas the ice crystals scatter the light beam and cause a rotation of the wave. The ice crystals result in a more strongly scattered polarization with a slightly shifted orientation.

For example, the use of sensor recordings with polarization filters having different polarization angles enables a differentiation between water, snow, and black ice.

In embodiments, the first optical bandwidth comprises a bandwidth that is selected from a spectral range of between 400 nm and 900 nm. At the same time, the second optical bandwidth comprises a bandwidth that is selected from a spectral range of between 900 nm and 1200 nm.

The above-mentioned selection of the first optical bandwidth and the second optical bandwidth enables between the recordings an optimum intensity difference in areas with water.

In embodiments, the first optical bandwidth comprises at a half-power bandwidth a value of between 820 nm and 870 nm, and the second optical bandwidth comprises at a half-power bandwidth a value of between 920 nm and 970 nm.

An optimum selection of the first optical bandwidth and the second optical bandwidth enables between the recordings a maximum possible intensity difference in areas with water.

In embodiments, the polarization angle of the first polarization filter and the polarization angle of the second polarization filter are dimensioned to be shifted by 90° with respect to each other.

Evenly distributed polarization angles provide the largest amount of information about the light beams reflected on the surface. Two polarization filters provide sufficient information about the polarization plane of the light beam.

In embodiments, the classifier comprises a memory having stored therein for each input tuple of a plurality of possible tuples an associated piece of state information of a plurality of different state information. The plurality of different state information comprises a state of dry, a state of wet, a state of snow, and a state of black ice, for example.

Using a classifier that stores the state information of the possible states, such as "wet", "dry", "snow", and "black ice", and that compares the state information with an input tuple decreases the required computational effort in contrast to current methods such as image detection.

In embodiments, the classifier is configured to round the at least two parameters of the tuple to values of an existing input tuple, and to then access the storage by using the existing input tuple to obtain the state for the window.

In other embodiments, the classifier is configured to select, on the basis of the tuple for the window, an input tuple that comes closest to the tuple for the window according to a criterion. For example, the criterion is a smallest added square deviation of the at least two parameters of the tuple for the window with respect to the existing input tuples. The classifier is then configured to access the memory with the selected tuple and to obtain the state for the window.

The memory of the classifier cannot comprise all state information of the possible states. If the at least two parameters of the tuple cannot be found in the memory of the classifier, the classifier may slightly change the parameters prior to the comparison. Thus, the changed parameters of the tuple can now be found in the storage. Through this, the state of the window remains detectable.

In embodiments, the classifier is configured to use for each of the plurality of windows an individual tuple so as to detect a state of each window on the basis of each tuple, and to output the state of each window of the recording information of the road surface as an output value. This results in a window-by-window, or an elementary, classification.

The window-by-window classification increases the resilience of the apparatus against image element errors. Image elements of a window may only effect the state of the window. The effect of an image element or an image element error is limited to the window.

The window-by-window classification also enables a window-by-window evaluation. The quality of the classification may now be determined by a comparison of the window with the result of the classification.

In embodiments, the classifier is configured to classify, by using states of neighboring windows, continuous areas of several adjacent windows in a block-by-block manner.

Now, continuous areas that are created from several adjacent windows are defined. The determination of the boundaries of continuous areas are very useful to avoid different dangers in driving situations.

In embodiments, the parameter calculator is configured to calculate at least two parameters from the group of an absorption contrast parameter, a polarization contrast parameter, and a reflection intensity parameter.

For example, the absorption contrast parameter is calculated such that the value of the absorption contrast parameter comprises a number of within ±20% of a result of the following equation:

$$\text{abs}_{contrast} = \frac{1}{n}\sum_{i=1}^{n} \frac{I_{850}(i) - I_{950}(i)}{I_{850}(i) + I_{950}(i)}$$

where:
  $\text{abs}_{contrast}$: is the result;
  n: is an image element number in the window;
  i: is an index of an image element in the window;
  $I_{850}(i)$: is an intensity value of the first sensor recording of the i-th image element in the window, and
  $I_{950}(i)$: is an intensity value of the second sensor recording of the i-th image element in the window.

For example, the polarization contrast parameter is calculated such that the value of the polarization contrast parameter comprises a number of within ±20% of a result of the following equation:

$$pol_{contrast} = \frac{1}{n}\sum_{i=1}^{n} \frac{I_{pol1}(i) - I_{pol2}(i)}{I_{pol1}(i) + I_{pol2}(i)}$$

where:
$pol_{contrast}$: is the result;
n: is an image element number in the window;
i: is an index of an image element in the window;
$I_{pol1}(i)$: is an intensity value of the third sensor recording of the i-th image element in the window, and
$I_{pol2}(i)$: is an intensity value of the fourth sensor recording of the i-th image element in the window.

For example, the reflection intensity parameter is calculated such that the value of the reflection intensity parameter comprises a number of within ±20% of a result of the following equation:

$$ref_{mean} = \frac{1}{n}\sum_{i=1}^{n} \frac{I_{pol1}(i) + I_{pol2}(i) + I_{850}(i)}{3},$$

where:
$ref_{mean}$: is the result;
n: is an image element number in the window;
i: is an index of the image element in the window;
$I_{pol1}(i)$: is an intensity value of the third sensory recording of the i-th image element in the window,
$I_{pol2}(i)$: is an intensity value of the fourth sensor recording of the i-th image element in the window, and
$I_{850}(i)$: is an intensity value of the first sensor recording of the i-th image element in the window.

In embodiments, the image divider is configured to divide the recording information into a plurality of non-overlapping windows.

The number of the non-overlapping windows is significantly smaller than the number of the possible overlapping windows. A reduction of the number of the windows to the number of the non-overlapping windows saves computation effort.

In embodiments, the image divider is configured to divide the recording information into a plurality of windows with a position-dependent window size, wherein the window that represents a near road surface portion is larger than the window that represents a distant road surface portion.

In case of a position-dependent or dynamic window size, the window size is automatically controlled on the basis of the position of the window. An optimum window size increases the resilience of the window against possible image element errors. A large number of the image elements in a window makes it possible to ignore erroneous image elements. At the same time, the optimum image window size decreases the number of possible state misinterpretations. Distant objects are smaller in an image and can be mixed more easily with the background than near objects.

In embodiments, the parameter calculator is configured to apply an angle correction to the individual windows of the recording information prior to the calculation of the parameters. Each image element of the window is corrected depending on the angle of the incident light with respect to the road surface. A correction for a window that represents a near road surface portion differs from a correction for a window that represents a distant road surface portion.

The angle of the camera with respect to the road may be determined with known window positions in the image. For example, if the aperture angle of the camera is 22°, the pixels at the upper edge of the image are inclined at <1° and at the lower edge at proximately 22° with respect to the road surface. This constitutes a significant difference in the reflection behavior. An angle correction can minimize these differences.

In embodiments, the classifier is configured to associate each tuple to a state depending on an angle of the incident light with respect to the road surface.

The angle of the camera with respect to the road may be determined with known window positions in the image. For example, if the aperture angle of the camera is 22°, the pixels at the upper edge of the image are inclined at <1° and at the lower edge at proximately 22° with respect to the road surface. This constitutes a significant difference in the reflection behavior. With the help of significantly more training data, the incorporation of this angle information may lead to a more precise classification.

Embodiments of the invention provide a means of transportation, or a vehicle, with the apparatus and an interface. The interface is configured to notify a driver of the means of transportation, and/or to influence a control of the means of transportation if the apparatus detects a solid state of the water.

The apparatus of the means for transportation enables secure driving through preventive localization and detection of wet areas, puddles, and ice or snow formations, so as to derive therefrom the actual danger or the actual risk of a loss of traction. The preventive risk detection prior to the actual loss of traction may enable a system to notify the driver via the interface or to influence the control of the means of transportation.

Further embodiments according to the present invention provide corresponding methods, or computer programs.

Embodiments of the present invention provide an apparatus and a method for detecting water and ice on road surfaces by incorporating water-specific optical properties.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
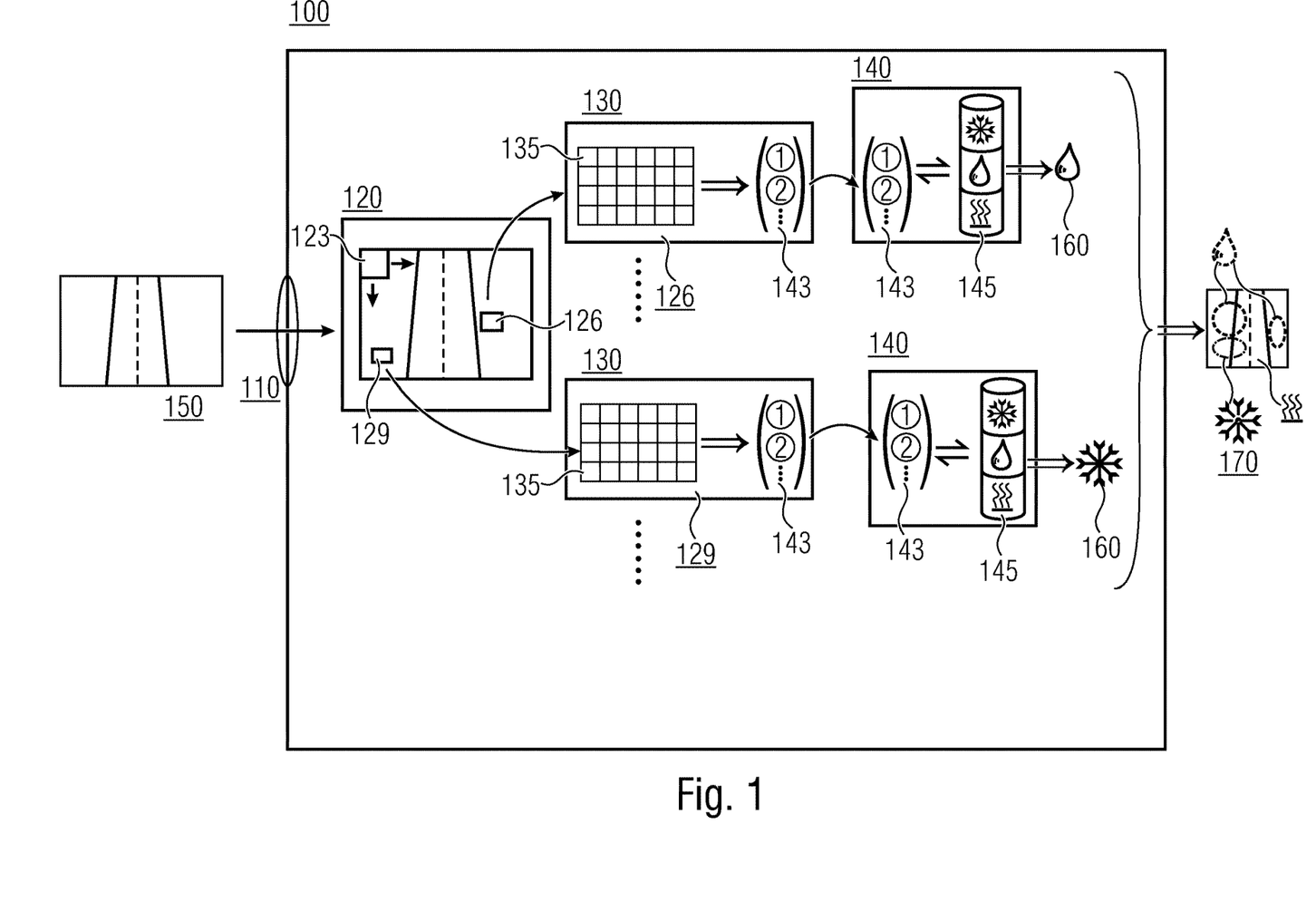
FIG. 1 shows a schematic illustration of an embodiment of an apparatus with an input interface, an image divider, a parameter calculator, and a classifier.

FIG. 1 shows a schematic illustration of an embodiment of an apparatus 100 for detecting a state of a road surface. The apparatus comprises an input interface 110, an image divider 120, a parameter calculator 130, and a classifier 140.

The input interface 110 is configured to obtain recording information 150 of the road surface and to forward it to the image divider 120.

The image divider 120 divides the recording information 150 into a plurality of windows and forwards the windows, e.g. the windows 123, 126 and 129, to the parameter calculator 130.

Beside the predetermined window sizes, the image divider 120 may also use a dynamic window size. In case of a dynamic window size, the window size is automatically controlled depending on the window position in the image. An example for a dynamic window size can be found in FIG. 2.

Each window comprises a plurality of image elements 135, wherein each image element 135 comprises at least two different pieces of information.

The parameter calculator 130 is configured to create one tuple 143 per window, wherein the tuple comprises at least two parameters. The at least two parameters are calculated by using the at least two different pieces of information of each image element. The tuple 143 is forwarded to the classifier 140.

The classifier 140 includes a memory 145 and/or a database 145 with different possible state information. The classifier 140 is configured to compare each tuple 143 with a plurality of state information stored in the memory 145 and/or the database 145, and to detect the state 160 of the window 126 or 129 of the recording information 150 on the basis of this comparison.

Figure 3:
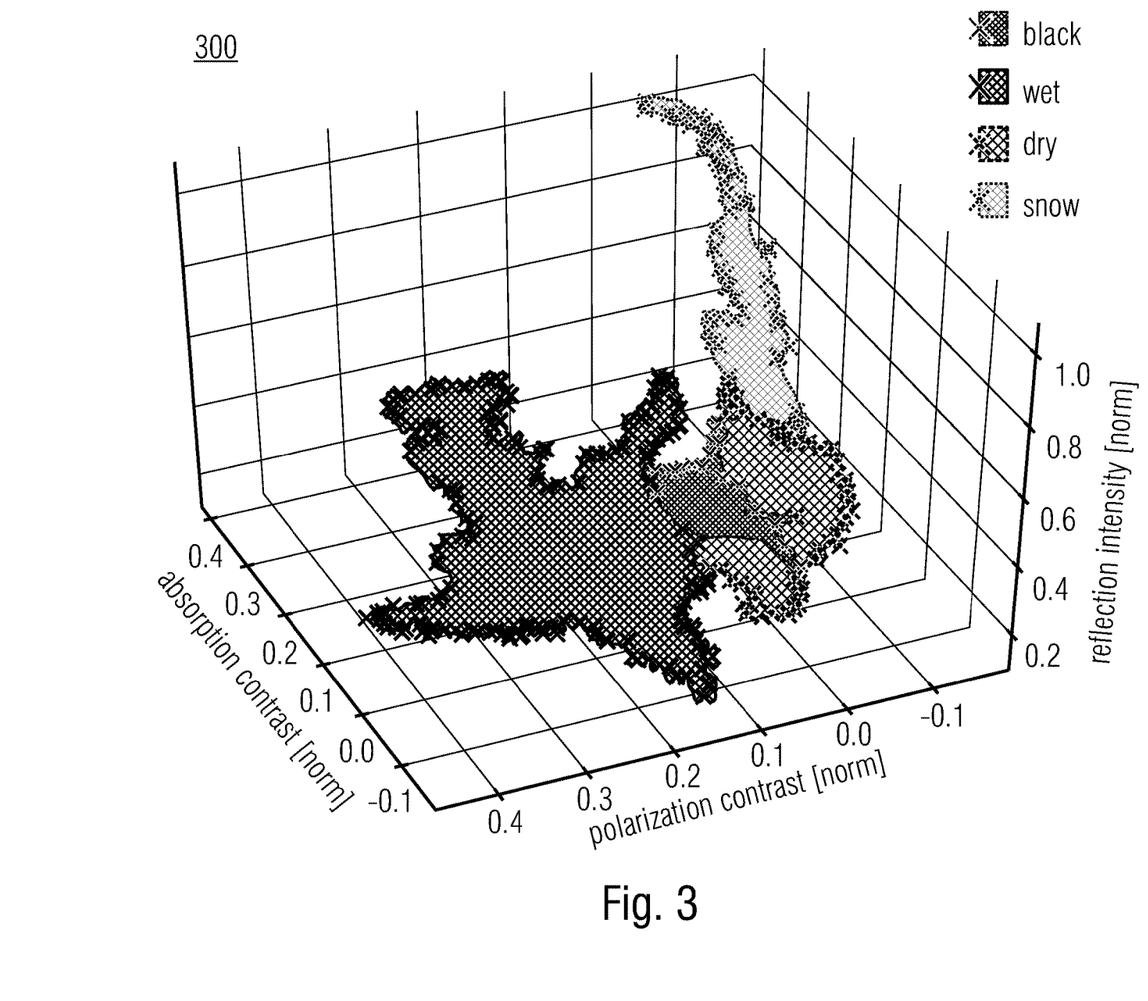
FIG. 3 shows a three-dimensional diagram in which each dot represents a window, and wherein the x, y, z coordinates represent three parameters of the window, i.e. the absorption contrast parameter, the polarization contrast parameter, and the reflection intensity parameter.

The state information stored in the memory 145 and/or the database 145, may be visualized in a 3D diagram, similar to the 3D diagram 300 in FIG. 3, for example.

The state 170 of the entire recording information 150 is assembled from the states 160 of the individual windows. Here, the classifier 140 may mutually classify several adjacent windows with the same state.

Figure 2:
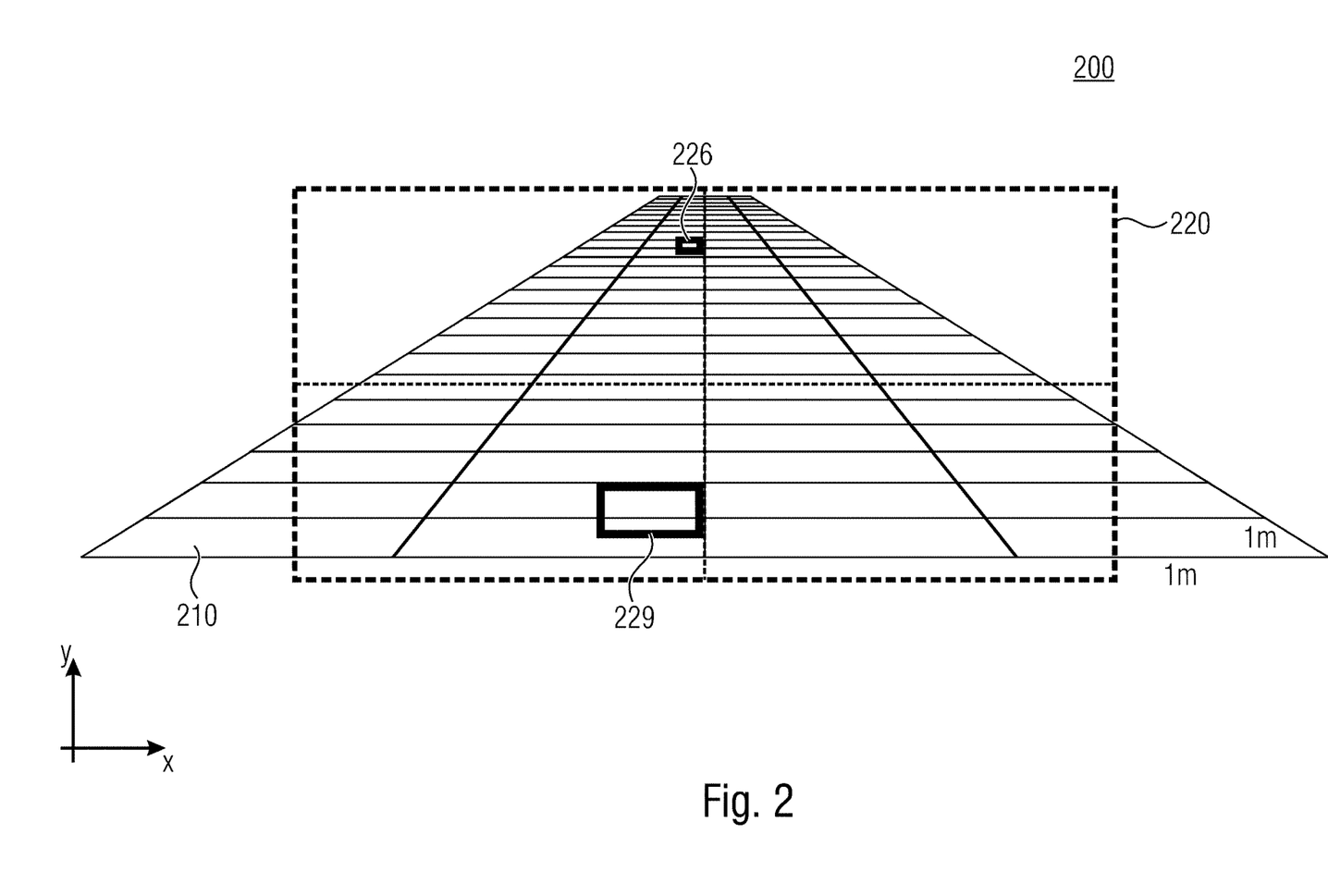
FIG. 2 shows a schematic perspective illustration of a road surface and a frame representing a piece of recording information of the road surface, with two windows having different sizes.

FIG. 2 shows a schematic perspective illustration 200 of a road surface 210 with a grid pattern. Each box of the grid pattern represents a square area of the road of 1 m×1 m. FIG. 2 further shows a frame 220 representing recording information 220 of the road surface. The recording information 220 is similar to the recording information 150 in FIG. 1. The recording information 220 comprises two windows 226 and 229 with different window sizes.

Similar to the recording information 150 in FIG. 1, the recording information 220 is forwarded to the image divider 120 via the input interface 110. The image divider is configured to divide the recording 220 into a plurality of windows. The recorded image, or the recording information in the frame 220, is analyzed with the help of the windows.

Here, a window, such as the window 226 or 229, is selected to analyze the recorded image, or part of the recorded image. The size of the window is described using a number of pixels, or image elements, in the x and y orientations: $n_x \times n_y$. A higher number of pixels helps to prevent individual pixel errors or misinterpretations by means of averaging, however, which in turn increases the required computational capacity to be able to perform the operation fast enough, i.e. the parameter calculation and/or classification. However, if the selected window is significantly larger than the objects to be identified, the objects are mixed with the background by means of averaging.

Besides the predetermined window sizes of, e.g. 8×4, 8×8, 16×16, 32×32, the image divider 120 in FIG. 1 may use a dynamic window size. In case of a dynamic window size, the window size is automatically controlled depending on the window position in the image.

FIG. 2 shows two images 226 and 229 with different sizes. The window 226 in the upper area of the image is significantly smaller than the window 229 in the lower area of the image. The sizes of the windows 226, 229 are determined in an image position-dependent or dynamic way. The distance of a surface area with respect to the camera changes with the height, or with the y coordinate, of the image position. Distant surface areas are smaller in the image than near surface areas, and are located in the upper area of the image. Thus, the optimum window size in an upper area of the image will be smaller than the optimum window size in a lower area of the image. The dynamic window size guarantees the required precision for distant portions, or windows, and enables good averaging for closer objects.

The sensor recordings are scanned pixel by pixel or image element by image element with the selected window or with the dynamic window, and the data from the partial images or windows is processed. The pixel number in the window is calculated with the equation $n = n_x \cdot n_y$. In case of a dynamic window size, the pixel number of the windows is dynamically defined depending on the window position.

Each window comprises a plurality of image elements, such as n image elements, wherein each image element includes at least two different pieces of information. By using the at least two different pieces of information, the parameter calculator, such as the parameter calculator 130 in FIG. 1, will create at least two parameters per window from the group of an absorption contrast parameter, a polarization contrast parameter, and a reflection intensity parameter. For example, the parameter calculator may calculate the at least two parameters such that the values of the at least two parameters are within ±20% of the result of the following equation:

$$abs_{contrast} = \frac{1}{n} \sum_{i=1}^{n} \frac{I_{850}(i) - I_{950}(i)}{I_{850}(i) + I_{950}(i)},$$

$$pol_{contrast} = \frac{1}{n} \sum_{i=1}^{n} \frac{I_{pol1}(i) - I_{pol2}(i)}{I_{pol1}(i) + I_{pol2}(i)},$$

$$ref_{mean} = \frac{1}{n} \sum_{i=1}^{n} \frac{I_{pol1}(i) + I_{pol2}(i) + I_{850}(i)}{3},$$

wherein:
$abs_{contrast}$: is an absorption contrast parameter;
$pol_{contrast}$: is a polarization contrast parameter;
$ref_{mean}$: is a reflection intensity parameter;
n: is an image element number in the window;
i: is an index of an image element in the window;
$I_{850}(i)$: is an intensity value of the first sensor recording of the i-th image element in the window;
$I_{950}(i)$: is an intensity value of the second sensor recording of the i-th image element in the window;
$I_{pol1}(i)$: is an intensity value of the third sensor recording of the i-th image element in the window, and
$I_{pol2}(i)$: is an intensity value of the fourth sensor recording of the i-th image element in the window.

The at least two parameters of the window may be represented as a tuple, and each tuple may be illustrated in a 3D diagram, similar to the 3D diagram 300 in FIG. 3.

FIG. 3 shows a three-dimensional diagram, or a 3D plot 300, wherein each dot represents a window, similar to the windows 226 and 229 in FIG. 2. The x, y, z coordinates of a dot in the 3D diagram represent the three parameters of a window, i.e. the absorption contrast parameter, the polarization contrast parameter, and the reflection intensity parameter.

The 3D diagram 300 was created from several windows representing different road surfaces with different states. For example, the state files in the database of the classifier may be visualized with the 3D diagram 300. The parameters of the windows and the associated states are stored in the memory or in the database of the classifier. In the 3D diagram 300, the states "ice", "wet", "dry", and "snow" are represented with colors or different shadings.

The classifier will add a new window, or a new dot, in this 3D diagram 300 and will detect the state of the window on the basis of the position, or the area, of the new dot.

It quickly becomes evident that measurements of areas of identical road states yield tuples that are located in the same area. This enables a metrological separation, i.e. a classification of the states. If obvious clouds, or areas that are clearly separated become apparent, the states can actually be separated from each other in a metrological way. The particular advantage is that the method is not based on an object detection method of a e.g. multi-stage convolutional neural network that first searches for objects in general and then marks them with anchors to mark them in a further step or to label them, but that it evaluates the individual windows regardless of the overall window. This does not only render the inventive concept very robust against interferences, such as objects that are in the way, but the inventive concept is also very easy to comprehend, and therefore to verify with respect to its function.

The quality of the detection depends on the number of data. With additional data, a finer use of the states can be achieved. This may be actual data that is recorded with further cameras or filters, or information that is extracted with different methods from the existing camera images.

In addition, the classifier may also consider the window position, or the distance to the camera. With the known window position in the image, the angle of the camera with respect to the road may be determined. For example, the aperture angle of the camera in the embodiment is 22°. Thus, the pixels at the upper edge of the image are inclined at less than 1° and the pixels at the lower edge are inclined at approximately 220 with respect to the road surface, constituting a significant difference in the reflection behavior. Incorporating this information may lead to a more precise classification, however, it needs more training data.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or using a hardware device). In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein.

The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for detecting a state of a road surface comprising:
   an input interface for acquiring recording information of a road surface;
   an image divider for dividing the recording information into a plurality of windows, wherein each window comprises a plurality of image elements, wherein each image element comprises at least two different pieces of information;
   a parameter calculator for calculating at least two parameters per window by using the at least two different pieces of information of each image element in the window; and
   a classifier for classifying the window on the basis of a tuple of the at least two parameters of the window, wherein the classifier is configured to detect, on the basis of the tuple of the at least two parameters of the window, as input values a state of the window and to output the state of the window as an output value,
   wherein the input interface is configured to either acquire the recording information from a sensor, or to acquire several sensor recordings and to assemble the recording information from the acquired sensor recordings,
   wherein the recording information of the road surface comprise per image element a first sensor recording with a first polarization filter comprising a first polarization angle, and at least one sensor recordings from the following group of sensor recordings:
   a second sensor recording of the road surface with a first optical bandwidth in which water comprises a first absorption rate,
   a third sensor recording of the road surface with a second optical bandwidth in which water comprises a second absorption rate that is higher than the first absorption rate,
   and
   a fourth sensor recording with a second polarization filter comprising a second polarization angle, wherein the two polarization filters differ in their polarization angles.

2. Apparatus according to claim 1, wherein the first optical bandwidth comprises a bandwidth selected from a spectral range of between 400 nm and 900 nm; and the second optical bandwidth comprises a bandwidth selected from a spectral range of between 900 nm and 1200 nm.

3. Apparatus according to claim 1, wherein the first optical bandwidth comprises a value in which water has a first absorption rate, and the second optical bandwidth comprises a value in which water has a second absorption rate that is higher than the first absorption rate.

4. Apparatus according to claim 1, wherein the polarization angle of the first polarization filter and the polarization angle of the second polarization filter are dimensioned to be shifted by 90° with respect to each other.

5. Apparatus according to claim 1, wherein the classifier comprises a memory having stored therein for each input tuple of a plurality of possible tuples an associated piece of state information of a plurality of different state information, wherein the plurality of different state information comprises, e.g. a state of dry, a state of wet, a state of snow and a state of black ice.

6. Apparatus according to claim 5, wherein the classifier is configured to round the at least two parameters of the tuple to values of an existing input tuple, and to then access the memory by using the existing input tuple, or wherein the classifier is configured to select, on the basis of the tuple for the window, an input tuple that comes closest to the tuple for the window according to a criterion, and to then access the memory with the selected tuple to acquire the state for the window, wherein the criterion, for example, is a smallest added square deviation of the at least two parameters of the tuple for the window with respect to the existing input tuples.

7. Apparatus according to claim 1, wherein the classifier is configured to use for each of the plurality of windows an individual tuple so as to detect a state of each window on the basis of each tuple, and to output the state of each window of the recording information of the road surface as an output value.

8. Apparatus according to claim 7, wherein the classifier is configured to classify, by using states of neighboring windows, continuous areas of several adjacent window in a block-by-block manner.

9. Apparatus according to claim 1, wherein the parameter calculator is configured to calculate at least two parameters from the group of an absorption contrast parameter, a polarization contrast parameter, and a reflection intensity parameter.

10. Apparatus according to claim 1, wherein the parameter calculator is configured to calculate the absorption contrast parameter such that the value of the absorption contrast parameter comprises a number within +20% of a result of the following equation:

$$\text{abs}_{contrast} = \frac{1}{n}\sum_{i=1}^{n} \frac{I_{850}(i) - I_{950}(i)}{I_{850}(i) + I_{950}(i)},$$

where:
$\text{abs}_{contrast}$: is the result;
n: is an image element number in the window;
i: is an index of an image element in the window;
$I_{850}(i)$: is an intensity value of the second sensor recording of the i-th image element in the window, and
$I_{950}(i)$: is an intensity value of the third sensor recording of the i-th image element in the window.

11. Apparatus according to claim 1, wherein the parameter calculator is configured to calculate the polarization contrast parameter such that the value of the polarization contrast parameter is a number within ±20% of a result of the following equation:

$$pol_{contrast} = \frac{1}{n}\sum_{i=1}^{n} \frac{I_{pol1}(i) - I_{pol2}(i)}{I_{pol1}(i) + I_{pol2}(i)}$$

where:
$pol_{contrast}$: is the result;
n: is an image element number in the window;
i: is an index of an image element in the window;
$I_{pol1}(i)$: is an intensity value of the first sensor recording of the i-th image element in the window, and
$I_{pol2}(i)$: is an intensity value of the fourth sensor recording of the i-th image element in the window.

12. Apparatus according to claim 1, wherein the parameter calculator is configured to calculate the reflection intensity parameter such that the value of the reflection intensity parameter is a number within ±20% of a result of the following equation:

$$ref_{mean} = \frac{1}{n}\sum_{i=1}^{n} \frac{I_{pol1}(i) + I_{pol2}(i) + I_{850}(i)}{3},$$

where:
ref$_{mean}$: is the result;
n: is an image element number in the window;
i: is an index of an image element in the window;
$I_{pol1}(i)$: is an intensity value of the first sensor recording of the i-th image element in the window, and
$I_{pol2}(i)$: is an intensity value of the fourth sensor recording of the i-th image element in the window, and
$I_{850}(i)$: is an intensity value of the second sensor recording of the i-th image element in the window.

13. Apparatus according to claim 1, wherein the image divider is configured to divide the recording information into a plurality of non-overlapping windows.

14. Apparatus according to claim 1, wherein the image divider is configured to divide the recording information into a plurality of windows with a position-dependent window size, wherein the window that represents a near road surface portion is larger than the window that represents a distant road surface portion.

15. Apparatus according to claim 1, wherein the parameter calculator is configured to apply an angle correction to the individual windows of the recording information prior to calculating the parameters, wherein each image element of the window is corrected depending on an angle of the incident light with respect to the road surface, and wherein a correction for the window that represents a near road surface portion differs from a correction for a window that represents a distant road surface portion.

16. Apparatus according to claim 1, wherein the classifier is configured to associate each tuple to a state depending on an angle of an incident light with respect to the road surface.

17. Transportation device comprising the apparatus according to claim 1 and an interface, wherein the interface is configured to notify a driver of the transportation device and/or to influence a control of the transportation device, if the apparatus detects a solid state of water.

18. Method for detecting a state of a road surface, comprising:
acquiring recording information of the road surface;
wherein the recording information of the road surface comprise per image element a first sensor recording with a first polarization filter comprising a first polarization angle, and at least one sensor recordings from the following group of sensor recordings:
a second sensor recording of the road surface with a first optical bandwidth in which water comprises a first absorption rate,
a third sensor recording of the road surface with a second optical bandwidth in which water comprises a second absorption rate that is higher than the first absorption rate, and
a fourth sensor recording with a second polarization filter comprising a second polarization angle, wherein the two polarization filters differ in their polarization angles;
dividing the recording information into a plurality of windows, wherein each window comprises a plurality of image elements, wherein each element comprises at least two different pieces of information;
calculating at least two parameters per window by using the at least two different pieces of information of each image element in the window; and
classifying the window on the basis of a tuple of the at least two parameters of the window so as to acquire, on the basis of the tuple of the at least two parameters of the window, a state of the window.

19. Non-transitory digital storage medium having a computer program stored thereon to perform the method for detecting a state of a road surface, comprising:
acquiring recording information of the road surface;
wherein the recording information of the road surface comprise per image element a first sensor recording with a first polarization filter comprising a first polarization angle, and at least one sensor recordings from the following group of sensor recordings:
a second sensor recording of the road surface with a first optical bandwidth in which water comprises a first absorption rate,
a third sensor recording of the road surface with a second optical bandwidth in which water comprises a second absorption rate that is higher than the first absorption rate, and
a fourth sensor recording with a second polarization filter comprising a second polarization angle, wherein the two polarization filters differ in their polarization angles;
dividing the recording information into a plurality of windows, wherein each window comprises a plurality of image elements, wherein each element comprises at least two different pieces of information;
calculating at least two parameters per window by using the at least two different pieces of information of each image element in the window; and
classifying the window on the basis of a tuple of the at least two parameters of the window so as to acquire, on the basis of the tuple of the at least two parameters of the window, a state of the window,
when said computer program is run by a computer.

* * * * *